US012715068B2

(12) United States Patent
Neufeld et al.

(10) Patent No.: US 12,715,068 B2
(45) Date of Patent: Aug. 25, 2026

(54) LASER-PROCESSING APPARATUS WITH DEBRIS REMOVAL SYSTEM AND INTEGRATED BEAM DUMP AND METHODS OF OPERATING THE SAME

(71) Applicant: Electro Scientific Industries, Inc., Beaverton, OR (US)

(72) Inventors: Corie Neufeld, Beaverton, OR (US); Zachary Dunn, Beaverton, OR (US); Timothy Nuckolls, Beaverton, OR (US); Jeremy Willey, Beaverton, MA (US)

(73) Assignee: Electro Scientific Industries, Inc., Beaverton, OR (US)

( * ) Notice: Subject to any disclaimer, the term of this patent is extended or adjusted under 35 U.S.C. 154(b) by 652 days.

(21) Appl. No.: 18/251,616

(22) PCT Filed: Oct. 7, 2021

(86) PCT No.: PCT/US2021/054014
§ 371 (c)(1),
(2) Date: May 3, 2023

(87) PCT Pub. No.: WO2022/103530
PCT Pub. Date: May 19, 2022

(65) Prior Publication Data

US 2023/0415264 A1 Dec. 28, 2023

Related U.S. Application Data

(60) Provisional application No. 63/113,378, filed on Nov. 13, 2020.

(51) Int. Cl.
*B23K 26/142* (2014.01)
*B23K 26/70* (2014.01)

(52) U.S. Cl.
CPC .......... *B23K 26/142* (2015.10); *B23K 26/702* (2015.10)

(58) Field of Classification Search
CPC .. B23K 26/142; B23K 26/702; B23K 26/082; B23K 26/16; B23K 26/704; B23K 26/705
See application file for complete search history.

(56) References Cited

U.S. PATENT DOCUMENTS 6,462,306 B1 * 10/2002 Kitai .................... B23K 26/382 219/121.76
7,528,349 B1 5/2009 Gotkis et al.
(Continued)

FOREIGN PATENT DOCUMENTS

CN 107398642 A 11/2017
DE 102019102233 A1 6/2020
(Continued)

OTHER PUBLICATIONS

The PCT/US2020/028738 International Search Report, issued Jan. 10, 2022 (4 pages).
(Continued)

*Primary Examiner* — Robert G Bachner
(74) *Attorney, Agent, or Firm* — Edward Scott Trask

(57) ABSTRACT

A laser-processing apparatus is disclosed. In one embodiment, the laser-processing apparatus includes a debris removal system with an integrated beam dump system, the beam dump system operative to selectively position an absorber within the beam path of a beam of laser energy. The beam dump system may allow the beam of laser energy to propagate through the scan lens of the laser-processing apparatus, but prevent the beam of laser energy from processing a workpiece. The beam dump system may include an actuator assembly operative to retract the absorber from the beam path, thereby allowing the beam to propagate to the workpiece and for debris from laser processing to be drawn
(Continued)

into a vacuum nozzle, thereby preventing damage to the scan lens. The beam dump system may further include a heat transfer system operative to control the rate of heat transferred away from the absorber.

8 Claims, 8 Drawing Sheets

(56) References Cited

U.S. PATENT DOCUMENTS

| | | | |
|---|---|---|---|
| 2009/0057567 A1 | 3/2009 | Bykanov et al. | |
| 2010/0301024 A1 | 12/2010 | Unrath | |
| 2013/0134318 A1 * | 5/2013 | Abhari | G02B 19/0095 250/372 |
| 2017/0043432 A1 | 2/2017 | Yoshii | |
| 2017/0106471 A1 | 4/2017 | Yoshii et al. | |
| 2019/0381609 A1 | 12/2019 | Hadano et al. | |

FOREIGN PATENT DOCUMENTS

| | | | |
|---|---|---|---|
| FR | 2989910 | A1 | 11/2013 |
| JP | 6285668 | A2 | 10/1994 |
| JP | H08318390 | A | 12/1996 |
| JP | 1998051055 | A | 2/1998 |
| JP | 2008290123 | A | 12/2008 |
| JP | 2014024117 | A | 2/2014 |
| JP | 2018103199 | A | 7/2018 |
| WO | 2018039248 | A1 | 3/2018 |
| WO | 2018/219739 | A1 | 12/2018 |

OTHER PUBLICATIONS

The PCT/US2020/028738 Written Opinion, issued Jan. 10, 2022 (4 pages).

Extended European Search Report issued for EP counterpart application No. 21892537.8 dated Nov. 28, 2024. (17 pages).

Office Action report issued in counterpart JP application No. 2023-528372 dated Feb. 18, 2025. (3 pages).

Office Action report issued in TW counterpart application No. 110137605 dated Apr. 18, 2025 (16 pages).

Search Report issued in CN counterpart application No. 202180069684.9 dated Apr. 18, 2026.

* cited by examiner

LASER-PROCESSING APPARATUS WITH DEBRIS REMOVAL SYSTEM AND INTEGRATED BEAM DUMP AND METHODS OF OPERATING THE SAME

CROSS-REFERENCE TO RELATED APPLICATIONS

The present application claims priority to Patent Cooperation Treaty Patent Application No. PCT/US2021/054014, filed on Oct. 7, 2021, entitled "LASER-PROCESSING APPARATUS WITH DEBRIS REMOVAL SYSTEM AND INTEGRATED BEAM DUMP AND METHODS OF OPERATING THE SAME", which claims priority to U.S. Provisional Patent Application Ser. No. 63/113,378 -entitled "LASER-PROCESSING APPARATUS WITH DEBRIS REMOVAL SYSTEM AND INTEGRATED BEAM DUMP AND METHODS OF OPERATING THE SAME", filed on Nov. 13, 2020, the contents of which are incorporated by reference in their entirety herein.

TECHNICAL FIELD

Embodiments described herein relate generally laser-processing apparatuses and components thereof and to techniques for operating the same.

BACKGROUND

Generally, a laser-processing apparatus can be used to process a workpiece by irradiating a beam of laser energy onto the workpiece. In some applications, the laser-processing apparatus must be capable of high-precision placement of laser spots on the workpiece, and this depends on maintaining critical tolerances and process parameters during operation.

Thermal stability of the laser beam path can be an important element of laser processing systems. In particular, thermal stability of transmissive beam path optics (e.g., beam expanders, beam shapers, wavefront compensation optics, relay optics and beam delivery optics) enables high precision laser spot placement and process constancy. To achieve high precision operation, the laser-processing apparatus may measure or calibrate laser beam parameters (e.g., spot size, focus location, etc.) and the position of the laser spot (e.g., expected position vs. measured position), using a beam characterization tool (e.g., beam profiler, power meter, beam position detector, etc.) positioned optically downstream of the beam delivery optics (e.g., near the workpiece). Results from these measurements or calibrations may be used to compute corrections to the expected beam placement or to compensate for sub-optimal beam characteristics.

When the laser processing apparatus is processing the workpiece (and during beam characterization), the beam is transmitted through all of the beam path optics, and the temperature of the beam delivery optics (e.g., the scan lens) may reach a steady state. During periods when the apparatus is not being characterized or processing the workpiece (e.g., during system idle, load or unload of workpieces, workpiece inspection, etc.), the beam may be blocked before reaching the scan lens (e.g., by laser shutters, modulators, or beam dumps located optically upstream of the scan lens). During these periods, the scan lens temperature may drop. When processing resumes, the corrections or compensations that were computed when the scan lens was hotter may no longer be correct (e.g., due to a change in the index of refraction of the scan lens from the change in temperature) resulting in an error in the position of the beam spot. As such, maintaining a stable temperature of the scan lens is important to enable high-precision operation of the laser-processing apparatus.

The embodiments discussed herein were developed in recognition of these and other problems discovered by the inventors.

SUMMARY

One embodiment of the present invention can be characterized as a laser processing apparatus that includes: a laser source operative to generate beam of laser energy, wherein the beam of laser energy is propagatable along a beam path; a scan lens; and a debris removal system, wherein the debris removal system includes a beam dump system operative to absorb a portion of the beam of laser energy, and wherein the scan lens is positioned along the beam path between the laser source and the debris removal system.

Another embodiment of the present invention can be characterized as a laser processing apparatus that includes: a laser source operative to generate beam of laser energy, wherein the beam of laser energy is propagatable along a beam path; a scan lens; and a beam dump system including an absorber operative to be selectively positioned within the beam path by an actuator assembly, the absorber operative to absorb a portion of the beam of laser energy; wherein the scan lens is positioned along the beam path between the laser source and the beam dump system.

Another embodiment of the present invention can be characterized as a system that includes: a debris removal system having a vacuum nozzle configured to allow a beam of laser energy propagating along a beam path to pass therethrough; a vacuum source in communication with the vacuum nozzle via an exhaust passage, the vacuum source configured to remove at least a portion of debris generated by the beam of laser energy impinging a workpiece from the vacuum nozzle; an exhaust assist system operative to direct a fluid from an inlet port across the vacuum nozzle into the exhaust passage, thereby forcing at least a portion of the debris into the exhaust passage; a beam dump system coupled to the debris removal system and including an absorber having an absorber surface formed thereon, the absorber surface configured to absorb at least a portion of a beam of laser energy propagating along a beam path; and an actuator assembly operative to move the absorber relative to the debris removal system.

DETAILED DESCRIPTION

Figure 1:
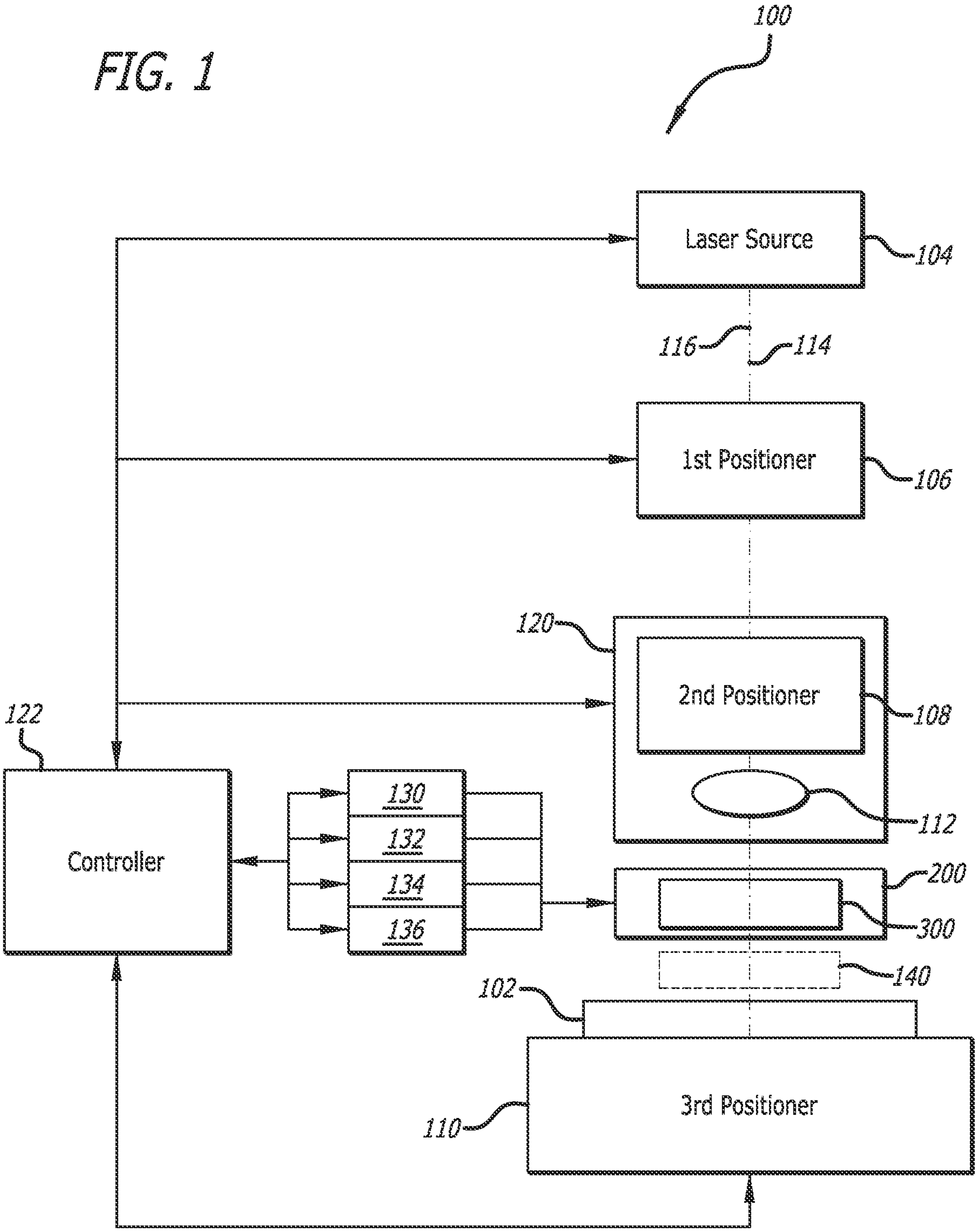
FIG. 1 schematically illustrates a laser-processing apparatus, according to one embodiment.

Example embodiments are described herein with reference to the accompanying drawings. Unless otherwise expressly stated, in the drawings the sizes, positions, etc., of components, features, elements, etc., as well as any distances therebetween, are not necessarily to scale, but are exaggerated for clarity. In the drawings, like numbers refer to like elements throughout. Thus, the same or similar numbers may be described with reference to other drawings even if they are neither mentioned nor described in the corresponding drawing. Also, even elements that are not denoted by reference numbers may be described with reference to other drawings.

The terminology used herein is for the purpose of describing particular example embodiments only and is not intended to be limiting. Unless otherwise defined, all terms (including technical and scientific terms) used herein have the same meaning as commonly understood by one of ordinary skill in the art. As used herein, the singular forms "a," "an" and "the" are intended to include the plural forms as well, unless the context clearly indicates otherwise. It should be recognized that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. Unless otherwise specified, a range of values, when recited, includes both the upper and lower limits of the range, as well as any sub-ranges therebetween. Unless indicated otherwise, terms such as "first," "second," etc., are only used to distinguish one element from another. For example, one node could be termed a "first node" and similarly, another node could be termed a "second node", or vice versa.

Unless indicated otherwise, the term "about," "thereabout," etc., means that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art. Spatially relative terms, such as "below," "beneath," "lower," "above," and "upper," and the like, may be used herein for ease of description to describe one element or feature's relationship to another element or feature, as illustrated in the FIG. 1*t* should be recognized that the spatially relative terms are intended to encompass different orientations in addition to the orientation depicted in the FIGS. For example, if an object in the FIGS. is turned over, elements described as "below" or "beneath" other elements or features would then be oriented "above" the other elements or features. Thus, the exemplary term "below" can encompass both an orientation of above and below. An object may be otherwise oriented (e.g., rotated 90 degrees or at other orientations) and the spatially relative descriptors used herein may be interpreted accordingly.

The section headings used herein are for organizational purposes only and, unless explicitly stated otherwise, are not to be construed as limiting the subject matter described. It will be appreciated that many different forms, embodiments and combinations are possible without deviating from the spirit and teachings of this disclosure and so this disclosure should not be construed as limited to the example embodiments set forth herein. Rather, these examples and embodiments are provided so that this disclosure will be thorough and complete, and will convey the scope of the disclosure to those skilled in the art.

I. SYSTEM—OVERVIEW

FIG. 1 schematically illustrates a laser-processing apparatus in accordance with one embodiment of the present invention.

Referring to the embodiment shown in FIG. 1, a laser-processing apparatus 100 (also referred to herein simply as an "apparatus") for processing a workpiece can be characterized as including a laser source 104 for generating a beam of laser energy, a first positioner 106, a second positioner 108, a third positioner 110 and a scan lens 112. The scan lens 112 one of the positioners can, optionally, be integrated into a common housing or "scan head" 120. For example, scan lens 112 and the second positioner 108 can be integrated into a common scan head 120. Each of the first positioner 106 and the second positioner 108 is operative to diffract, reflect, refract, or otherwise deflect the beam of laser energy 116 so as to deflect a beam path 114 along which laser energy in the beam of laser energy travels as it propagates from the laser source 104 to the scan lens 112. The scan lens 112 focuses an incident beam of laser energy, which is ultimately delivered to a workpiece 102. Although FIG. 1 illustrates the laser-processing apparatus 100 as including the first positioner 106 and the second positioner 108, it will be appreciated that one or both of these optical components may be omitted from the laser-processing apparatus 100 if desired. Likewise, the third positioner 110 may be omitted if desired. Although not illustrated, the laser-processing apparatus 100 may include one or more other optical components (also referred to herein as "optics", such as mirrors, lenses, polarizers, waveplates, apertures, beam expanders, beam shapers, wavefront compensation optics, relay optics, or the like or any combination thereof) arranged in the beam path between the laser source 104 and the scan lens 112.

In one embodiment, the apparatus 100 may include a beam dump system 140 operative to prevent the beam of laser energy 116 from reaching the workpiece 102. In another embodiment, the apparatus 100 may include a debris removal system 200 operative to capture at least some debris (e.g., particulates, processing byproducts, gasses, vapors, etc.) created by the processing of the workpiece 102. Optionally, the debris removal system 200 may include an integrated beam dump system 300 operative to prevent the beam of laser energy 116 from reaching the workpiece 102. When the beam dump system 300 is integrated with the debris removal system 200, the beam dump system 140 can be omitted. Although FIG. 1 illustrates the beam dump system 140 as below the debris removal system 200, the beam dump system 140 may be arranged above the debris removal system 200 (i.e., between the scan lens 112 and the debris removal system 200).

Generally, the apparatus 100 includes one or more controllers, such as controller 122, to control, or facilitate control of, the operation of the apparatus 100. In one embodiment, the controller 122 is communicatively coupled (e.g., over one or more wired or wireless, serial or parallel, communications links, such as USB, RS-232, Ethernet, Firewire, Wi-Fi, RFID, NFC, Bluetooth, Li-Fi, SERCOS, MARCO, EtherCAT, or the like or any combination thereof) to one or more components of the apparatus 100, such as the laser source 104, the first positioner 106, the second positioner 108, third positioner 110, the scan lens 112 (when provided as a variable-focal length lens), etc., which are thus operative in response to one or more control signals output by the controller 122.

The apparatus 100 may also include a vacuum source 130, an exhaust assist fluid pressure source 132, an actuator fluid pressure source 134, and a heat transfer fluid source 136. As described in greater detail below, these fluid or vacuum sources 130, 132, 134 and 136 can be variously coupled to the debris removal system 200 and the beam dump systems 140 or 300 to facilitate operation thereof.

II. EXAMPLE EMBODIMENTS CONCERNING BEAM DUMP AND DEBRIS REMOVAL SYSTEMS

As described above, during operation of the apparatus 100, the scan lens 112 and other optics may undergo changes in temperature when portions of the beam of laser energy 116 are absorbed. Optionally, the apparatus 100 may measure or calibrate laser beam parameters (e.g., spot size, focus location, etc.) and the position of the laser spot (e.g., expected position vs. measured position) using a beam characterization tool (not shown) positioned optically downstream of the beam delivery optics. Results from these measurements or calibrations may be used to compute corrections to the expected beam placement or to compensate for sub-optimal beam characteristics. When the apparatus 100 is processing the workpiece 102 (and during beam characterization), and the beam is transmitted through all of the beam path optics, the temperature of the beam delivery optics (e.g., the scan lens 112) may reach a steady state. During periods when the apparatus 100 is not being characterized or processing the workpiece 102 (e.g., during system idle, load or unload of workpieces, workpiece inspection, etc.) the beam may be blocked before reaching the scan lens 112 (e.g., by laser shutters, modulators, or beam dumps located optically upstream of the scan lens 112). During these periods, the temperature of the scan lens 112 may drop. When processing resumes, the corrections or compensations that were computed when the scan lens 112 was hotter may no longer be correct (e.g., due to a change in the index of refraction of the scan lens 112 from the change in temperature) resulting in an error in the position of the beam spot. What follows below is a discussion of exemplary embodiments that may be used to position a beam dump optically downstream of the scan lens 112, thereby allowing the beam of laser energy 116 to pass through the scan lens 112 under all operating conditions.

a. Beam Dump System

Figure 2:
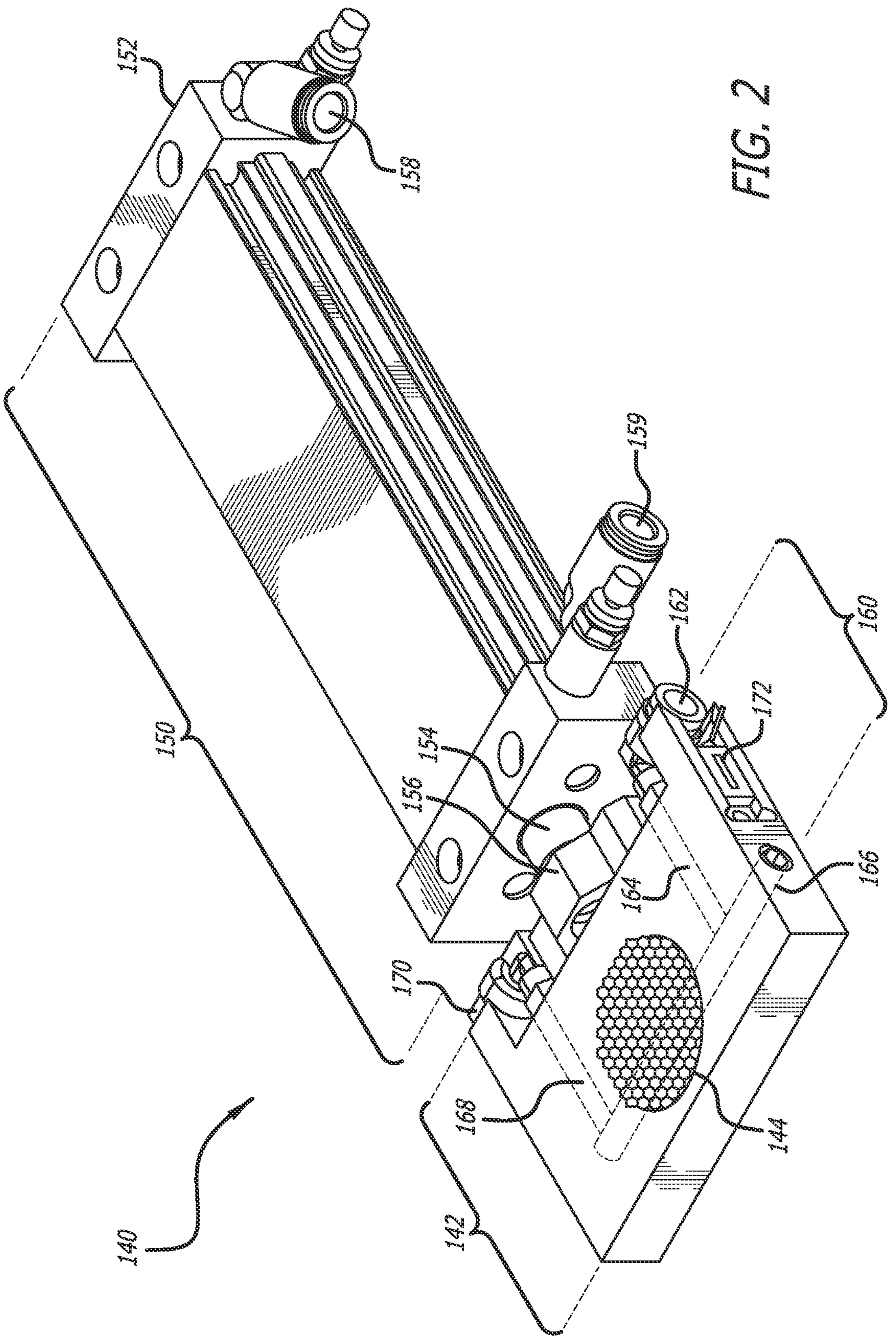
FIG. 2 shows a perspective view of a beam dump system, according to one embodiment.

FIG. 2 shows a perspective view of an exemplary beam dump system 140 shown in a retracted position. As shown, the beam dump system 140 can include an absorber 142, an actuator assembly 150 operative to selectively position the absorber 142, and a heat transfer system 160 operative to conduct heat away from the absorber 142.

The absorber 142 can include an absorber surface 144 formed thereon or attached thereto, the absorber surface 144 formed from a material (e.g., steel, brass, aluminum, copper, copper-tungsten, silicon carbide, or the like or any combination thereof) selected to absorb the beam of laser energy 116. The absorber surface 144 may also have surface features (e.g., raised or lowered regions, dimples, etc.) configured to enable absorption of the beam of laser energy 116 and to minimize reflection of the beam of laser energy 116 back toward the scan lens 112 and laser source 104. The absorber surface 144 may be otherwise provided as an optically absorptive surface (e.g., roughened, anodized, or oxidized) configured to enhance the absorption of the beam of laser energy 116. The absorber surface 144 may be coated (e.g., via an electroplating process, an electroless plating process, a vacuum deposition process, a painting process, or the like or any combination thereof) with a material that is suitably absorptive to the beam of laser energy 116 incident thereon.

The actuator assembly 150 may be provided as a pneumatic or hydraulic cylinder assembly, including an actuator cylinder 152 having an actuator piston 154 with an insulator 156 configured to couple the actuator piston 154 to the absorber 142. The insulator 156 may be formed of materials (e.g., composites, ceramics, heat-resistant polymers, or the like or any combination thereof) selected to reduce the amount of heat transferred from the absorber 142 to the actuator piston 154 and the actuator cylinder 152, thereby preventing damage to seals or other components of the actuator assembly 150. The actuator assembly 150 may include fluid ports 158 and 159 positioned on opposing ends of the actuator cylinder 152 and in communication with the actuator fluid pressure source 134 and configured to allow fluid to enter and exit the cylinder 152 to extend and retract the actuator piston 154.

The heat transfer system 160 may be provided as a heat sink, Peltier heat pump, water block, or the like or any combination thereof. As shown in FIG. 2, in one embodiment, the heat transfer system 160 may circulate a heat transfer fluid (e.g., a gas, liquid or vapor supplied by the heat transfer fluid source 136) through the absorber 142 (e.g., entering an inlet 162, flowing through passages 164, 166 and 168 formed in the absorber 140, and exiting an outlet 170 (see also FIG. 4)) to transfer heat away from the absorber surface 144. A thermal sensor 172 operative to sense the temperature of the absorber 142 may be mounted on or in thermal communication with the absorber 142. During operation, the thermal sensor 172 may send a signal proportional to the temperature of the absorber 142 to the controller 122 and/or the heat transfer fluid source 136 in order to allow the rate of heat transfer from the absorber 142 to be controlled. In another embodiment, the heat transfer system 160 may be provided as a radiative heat sink or heat pump in thermal communication with the absorber 142 and the absorber surface 144.

Figure 3:
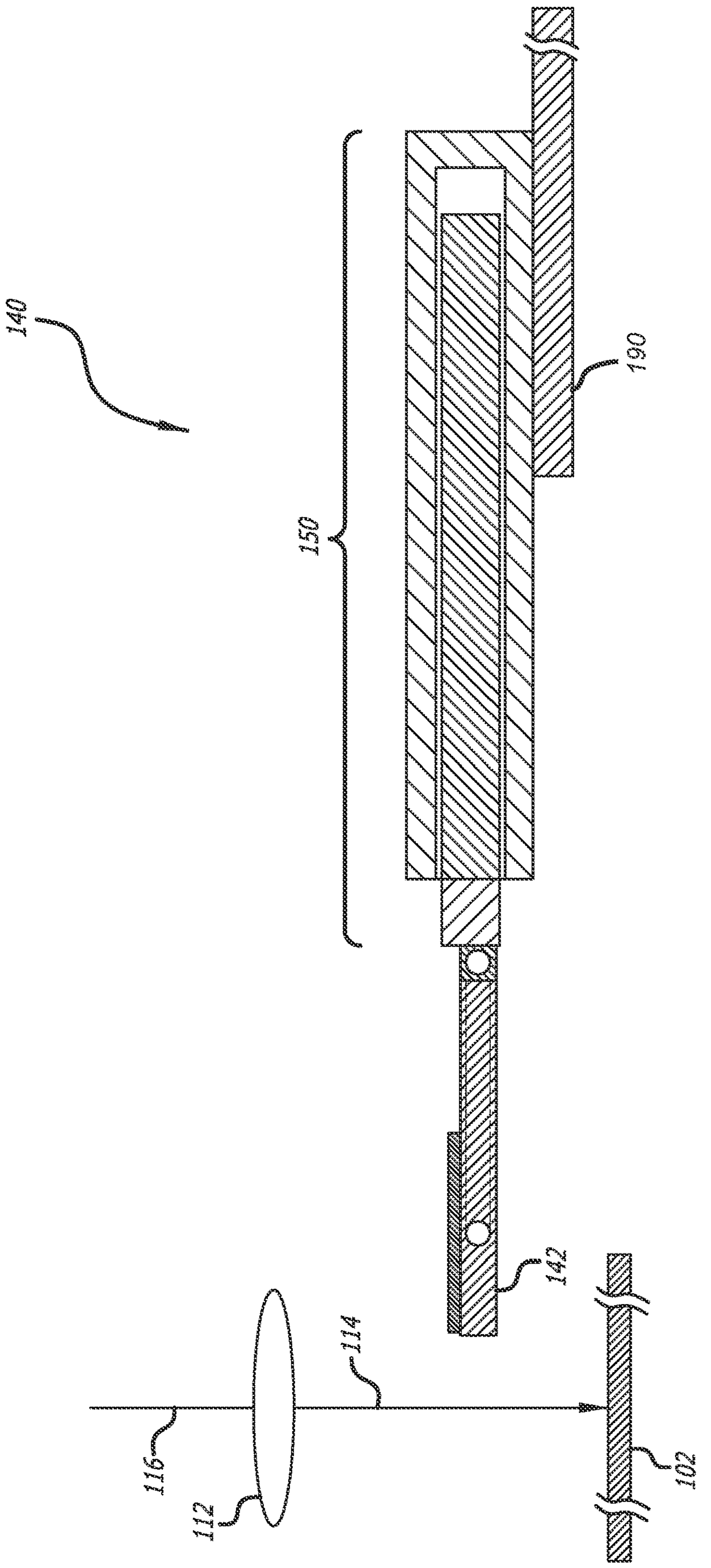
FIGS. 3 and 4 illustrate different positional states of the beam dump system shown in FIG. 2.
Figure 4:
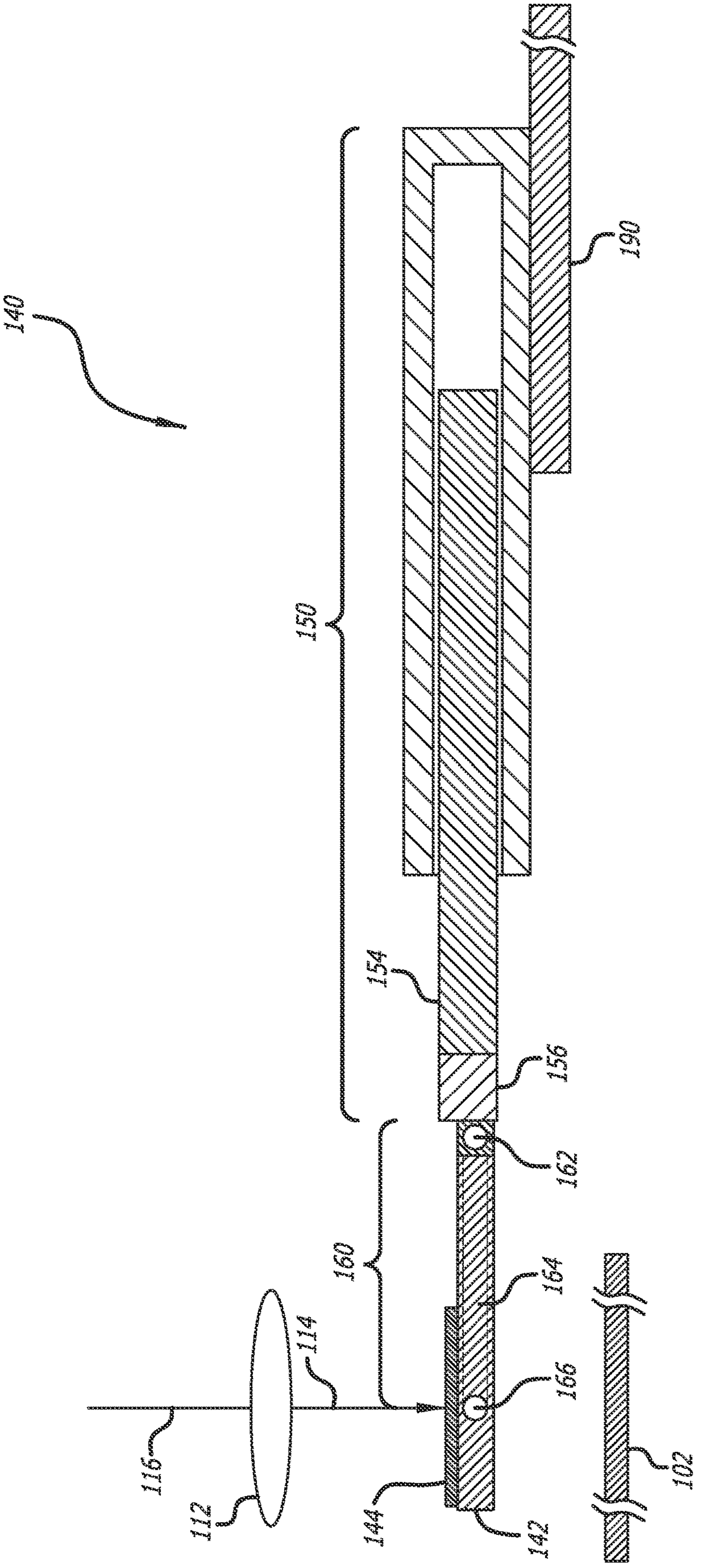

FIGS. 3 and 4 show cross-section views of different positional states of an exemplary embodiment of the beam dump system 140 during different modes of operation of the apparatus 100. FIG. 3 shows a cross-section view of the beam dump system 140 with the absorber 142 retracted by the actuator assembly 150, thereby allowing the beam of laser energy 116 to propagate along the beam path 114 and through the scan lens 112 to the workpiece 102 (e.g., to process the workpiece 102). The actuator assembly 150 may be fastened to an actuator mount 190 (e.g., by means of screws, adhesives, clamps, or the like or any combination thereof) that is located on a structure (e.g., a gantry) that is independent of the scan head 120 and the third positioner 110. Optionally, the actuator assembly 150 may be attached to or formed integral with the scan head 120 or the second positioner 108. The actuator assembly 150 may also be fixed relative to the scan head 120 and the third positioner 110. In another embodiment, the absorber 142 may be selectively positioned between the scan lens 112 and the workpiece 102 by a separate positioner (not shown).

FIG. 4 shows a cross-section view of the beam dump system 140 shown in an extended position, with the absorber 142 positioned within the beam path 114. The actuator assembly 150 extends the actuator piston 154 (e.g., in response to one or more control commands from the controller 122 or the actuator fluid pressure source 134 shown in FIG. 1), thereby positioning the absorber 142 within the beam path 114. As shown, the beam of laser energy 116 propagates through the scan lens 112, but is incident on the absorber surface 144, not on the workpiece 102. When the absorber 142 is positioned within the beam path 114, the heat transfer system 160 may be engaged as required (e.g., in response to commands from the controller 122 and/or the heat transfer fluid source 136 shown in FIG. 1) to control the transfer of heat away from the absorber 142 and the absorber surface 144. Heat transfer fluid from the heat transfer fluid source 136 (shown in FIG. 1) enters the inlet 162, flows through the passage 164, through the passage 166 below the absorber surface 144, and is routed to the passage 168, exiting the outlet 170 (as shown in FIG. 2). The insulator 156 may prevent residual heat from damaging the actuator assembly 150.

b. Debris Removal System with an Integrated Beam Dump System

In some cases, there may be little space for a beam dump system between the scan lens 112 and the workpiece 102, especially if the apparatus includes a debris removal system. Accordingly, one embodiment of the present invention can be broadly characterized as integrating a beam dump system 300 into the debris removal system 200. For example, one or more beam dump systems 300 may be arranged or integrated within or adjacent to the debris removal system 200 so that elements of the beam dump system 300 can be selectively positioned within the beam path 114 when desired (e.g., when commanded by the controller 122), without requiring additional space between the scan lens 112 and the workpiece 102. To operate the debris removal system 200 and the beam dump system 300, the apparatus 100 may include one or more vacuum or fluid pressure sources or controllers configured to supply vacuum or fluid pressure to the debris removal system 200 and the beam dump system 300. In the illustrated embodiment, four such sources are provided, including a vacuum source 130, an exhaust assist fluid pressure source 132, an actuator fluid pressure source 134, and a heat transfer fluid source 136. In the illustrated embodiment, the debris removal system 200 is located on a structure (e.g., a gantry) that is independent of the scan head 120 and the third positioner 110. Optionally, the debris removal system 200 may be attached to or formed integral with the scan head 120, or the second positioner 108. The debris removal system 200 may be fixed relative to the scan head 120 and the third positioner 110, or may be selectively positioned between the scan lens 112 and the workpiece 102 by a separate positioner (not shown).

Figure 5:
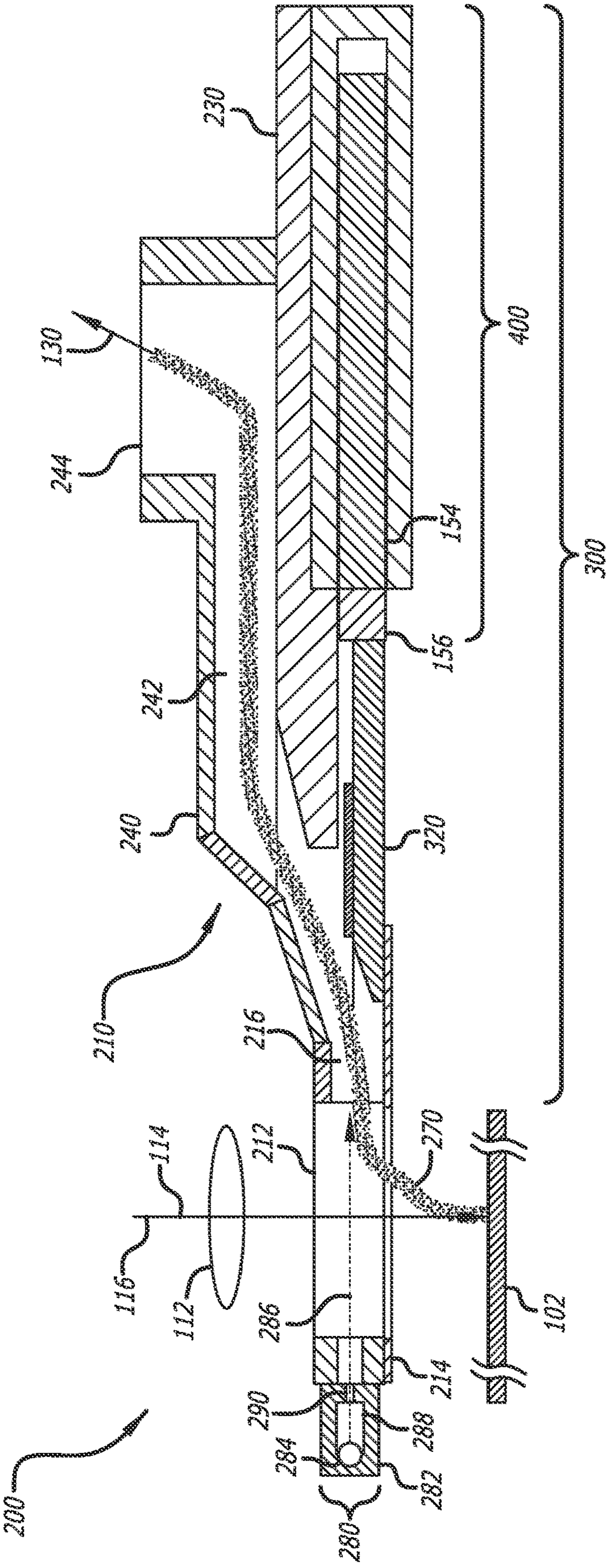
FIG. 5 shows a schematic section view of a debris removal system with an integrated beam dump system, according to one embodiment.

FIG. 5 shows a schematic cross-section view of a debris removal system 200 with an integrated beam dump system 300, according to one embodiment. The debris removal system 200 can include a debris removal housing 210 with a vacuum nozzle 212 and an exhaust passage 216 formed therein and in communication with the vacuum source 130. A plate or cover 214, arranged to prevent ambient air from entering the exhaust passage 216 without first entering into the vacuum nozzle 212, may be affixed to the debris removal housing 210 (e.g., by means of screws, adhesives, clamps, or the like or any combination thereof). Optionally, the cover 214 may be formed integral to the debris removal housing 210. The vacuum nozzle 212 may define a window or aperture arranged and sized to allow the beam of laser energy 116 propagating long the beam path 114 from the scan lens 112 to pass therethrough (e.g., to process the workpiece 102). Debris 270 (e.g., gasses, vapors, processing byproducts, or particulate matter such as metals, silicon, polymers, or the like, shown as a stream of speckles 270) generated by the laser machining process can be drawn into the vacuum nozzle 212 and subsequently advected into the exhaust passage 216. An exhaust manifold 240, arranged in communication with the vacuum source 130, may be positioned on the debris removal housing 210. Optionally, the debris removal housing 210 and the exhaust manifold 240 may form a monolithic structure. The exhaust manifold 240 has an exhaust passage 242 and an exhaust port 244 formed therein. The exhaust passage 242 is configured to allow the debris 270 to pass therethrough and exit the exhaust port 244.

The debris removal system 200 may also include an exhaust assist system 280. The exhaust assist system 280 may be operative to provide a flow of a fluid 286 (e.g., air or other gas) supplied from the exhaust assist fluid pressure source 132 shown in FIG. 1 (also referred to herein as "fluid pressure source 132") to force the debris 270 into the exhaust passage 216. The exhaust assist system 280 may include an exhaust assist body 282 with a plenum 288 formed therein, the plenum 288 configured to accept the fluid 286 (e.g., from the fluid pressure source 132) via a port 284. One or more ports 290 may be formed in the exhaust assist body 282, the ports 290 configured to create one or more streams of the fluid 286 operative to flow across the vacuum nozzle 212 toward the exhaust passage 216. The ports 290 may also be arranged and configured to create high velocity streams or a high velocity curtain of the fluid 286 flowing across the vacuum nozzle 212.

The vacuum nozzle 212 may also be sized to receive components of the beam dump system 300 therein. Similar to the beam dump system 140, the beam dump system 300 may be operative to selectively position an absorber 320 to absorb at least a portion of the beam of laser energy 116 propagating along the beam path 114. The beam dump system 300 may be fastened to an actuator mount 230 (e.g., by means of screws, adhesives, clamps, or the like or any combination thereof) formed on or attached to the debris removal housing 210 or exhaust manifold 240. The beam dump system 300 may also include an actuator assembly 400 operative to selectively position the absorber 320 within the window or aperture defined by the vacuum nozzle 212 and in the beam path 114 (e.g., by extension or retraction of an actuator piston 154 in response to control commands from the controller 122 and/or the actuator fluid pressure source 134).

During operation of the apparatus 100, when the beam of laser energy 116 is processing the workpiece 102, the debris 270 generated can be drawn or advected into the exhaust passage 216 (e.g., by the flow of fluid 286 from the exhaust assist system 280, by the vacuum drawn at the exhaust port 244 by the vacuum source 130, or a combination thereof). When the apparatus 100 is not processing the workpiece (e.g., during system idle, loading or unloading of workpieces, inspection of the workpiece, etc.), the actuator assembly 400 (e.g., in response to commands from the controller 122) may actuate the actuator piston 154 to position the absorber 320 within the vacuum nozzle 212 and the beam path 114. Once the absorber 320 is located within the beam path 114, the exhaust assist system 280 and the vacuum source 130 may be disengaged (e.g., because no debris is generated by the beam of laser energy 116). Alternatively, the exhaust assist system 280 and the vacuum source 130 may remain engaged when the absorber 320 is positioned within the beam path 114.

Figure 6:
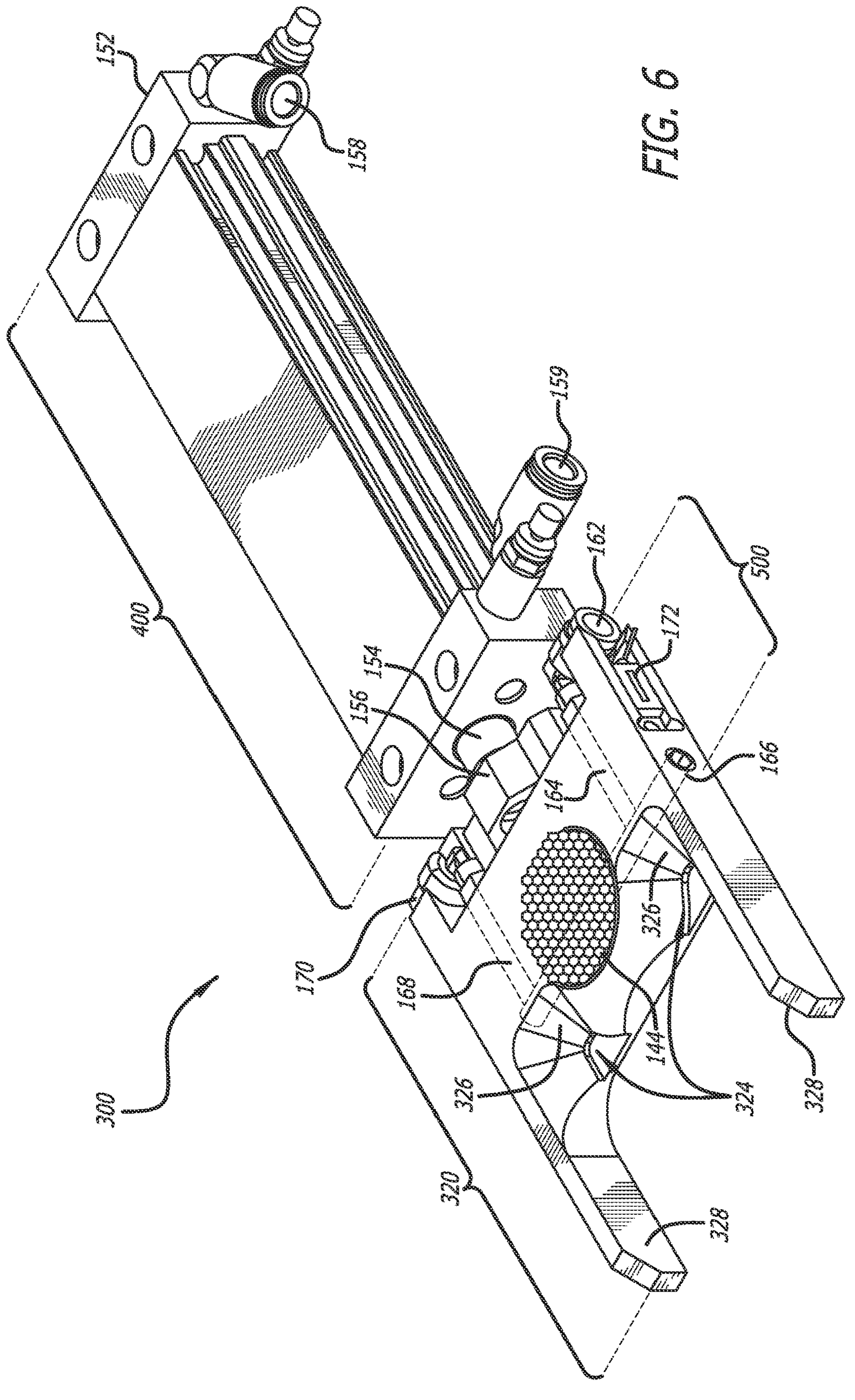
FIG. 6 shows a perspective view of a beam dump system, according to one embodiment.
Figure 7:
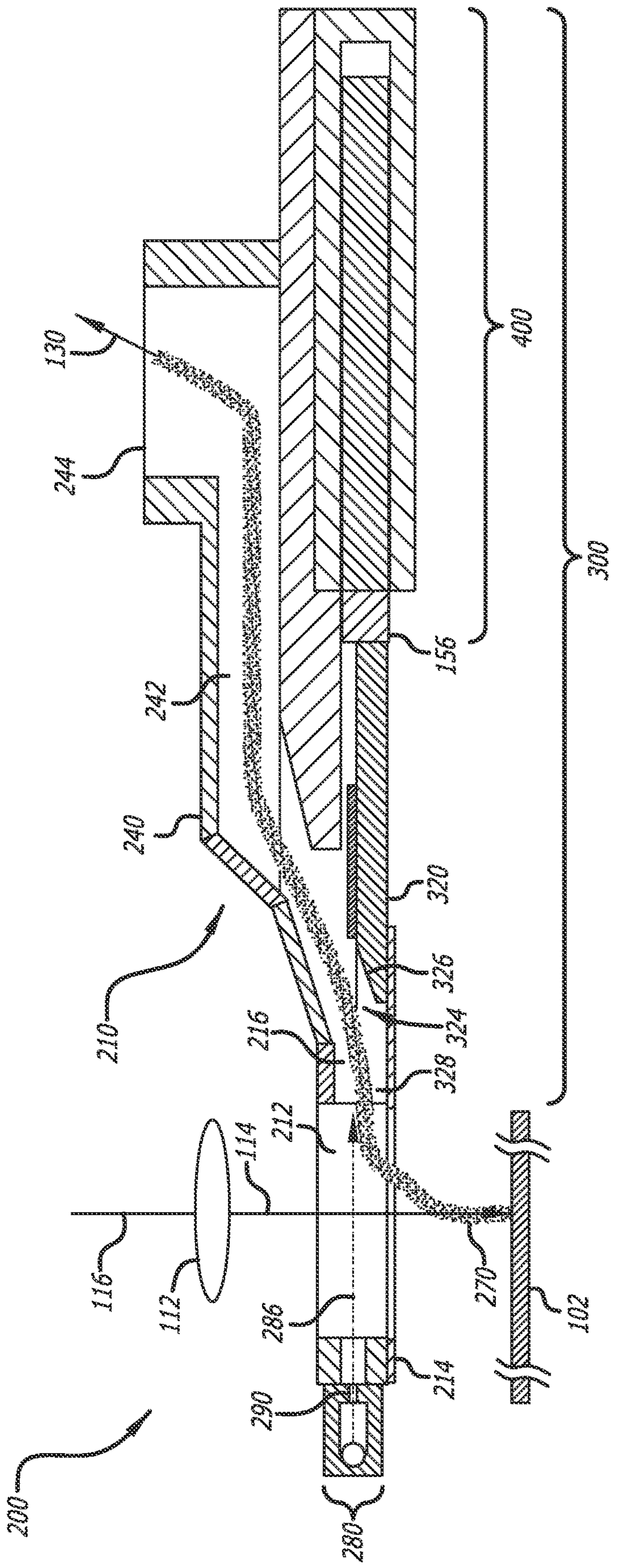
FIGS. 7 and 8 illustrate different positional states of the debris removal system with an integrated beam dump system shown in FIG. 6.

FIG. 6 shows a perspective view of the beam dump system 300 shown in a retracted position. As shown, the beam dump system 300 includes the aforementioned absorber 320 and actuator assembly 400 operative to selectively position the absorber 320, and a heat transfer system 500 operative to conduct heat away from the absorber 320. In one embodiment, the absorber 320 is provided in the same manner as the absorber 142. It will be appreciated, however, that the absorber 320 may be provided in any other suitable or desired configuration. According to the present embodiment, however, one or more recesses 324 including one or more tapered regions or sidewalls 326 may be formed on the absorber 320. The recesses 324 may be configured so that the absorber 320 does not restrict the transition from the vacuum nozzle 212 to the exhaust passage 216 when the absorber 320 is in a retracted position (as shown in FIG. 7), thereby allowing for efficient flow of the debris 270 from the vacuum nozzle 212 into the exhaust passage 216. The absorber 320 may also include one or more baffles 328 configured to block at least a portion of ambient air from entering the vacuum nozzle 212 when the absorber 320 is in a retracted position, thereby concentrating the flow of air and debris into the vacuum nozzle 212 and the exhaust passage 216.

In one embodiment, the actuator assembly 400 is provided in the same manner as the actuator assembly 150. It will be appreciated, however, that the actuator assembly 400 may be provided in any other suitable or desired configuration.

The heat transfer system 500 is thermally coupled to or integrated into the absorber 320 and configured to remove heat therefrom. In one embodiment, the heat transfer system 500 is provided in the same manner as the heat transfer system 160. It will be appreciated, however, that the heat transfer system 500 may be provided in any other suitable or desired configuration.

Figure 8:
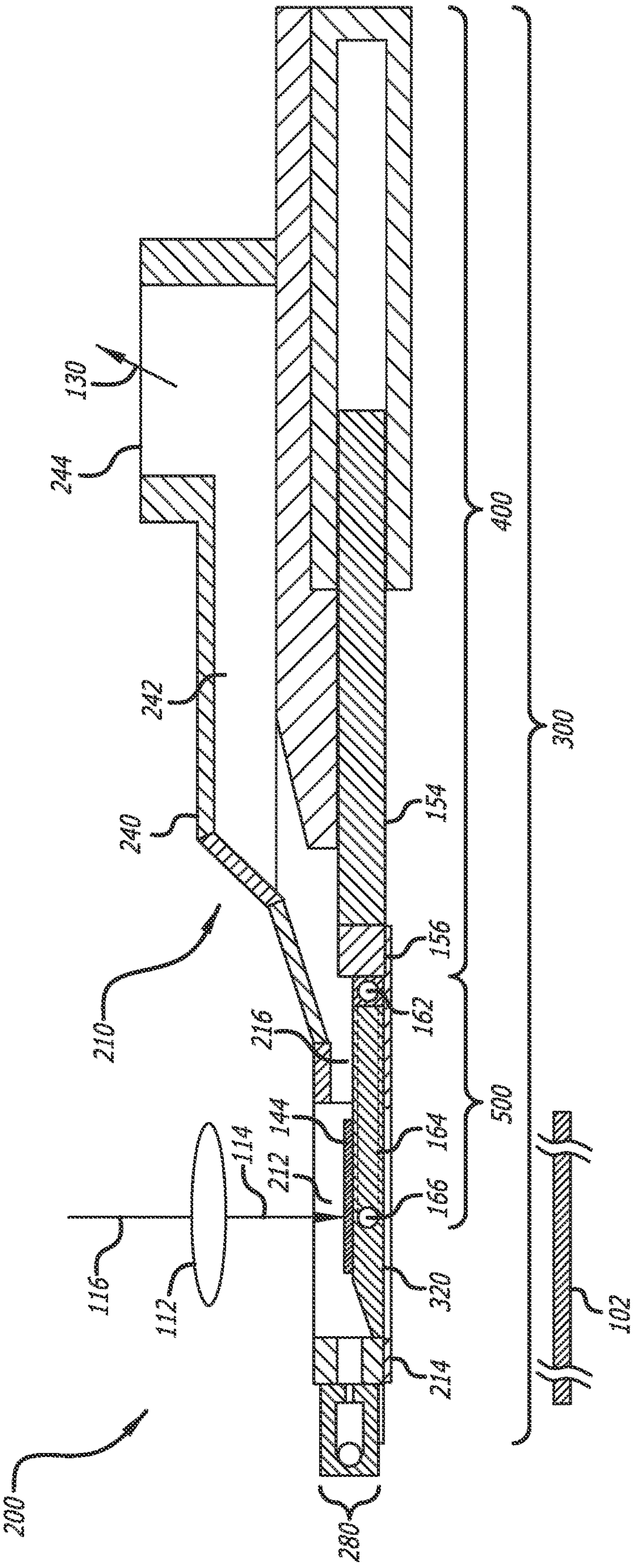

FIGS. 7 and 8 show cross-sectional views of different positional states of the beam dump system 300 during different modes of operation of the apparatus 100. FIG. 7 shows a cross-section view of the debris removal system 200 with the absorber 320 of the beam dump system 300 retracted by the actuator assembly 400, thereby allowing the beam of laser energy 116 to propagate along the beam path 114, and through the scan lens 112 (e.g., to process the workpiece 102). In this mode of operation, debris 270 generated by the beam of laser energy 116 processing the workpiece 102 can be drawn into the vacuum nozzle 212, into the exhaust passage 216 of the debris removal housing 210, and into the exhaust passage 242 of the exhaust manifold 240, exiting the exhaust port 244. The fluid 286 emitted from the ports 290 of the exhaust assist system 280 crosses the vacuum nozzle 212, forcing the debris 270 into the exhaust passage 216. As described above, the tapered regions 326 of the recesses 324 formed in the absorber 320 may deflect the debris 270 into the exhaust passage 216, thereby providing a smooth transition from the vacuum nozzle 212 to the exhaust passage 216 so that the debris to flow from the vacuum nozzle 212 into the exhaust passage 216. The baffles 328 formed on the absorber 320, and the cover 214 attached to the debris removal housing 210 help to prevent ambient air from entering the exhaust passage 216 and reducing the level of vacuum drawn by the vacuum source 130, thereby ensuring that the debris 270 is effectively removed from the vacuum nozzle 212.

FIG. 8 shows the debris removal system 200 with the beam dump system 300 positioned in the vacuum nozzle 212 within the beam path 114. The actuator assembly 400 extends the actuator piston 154 (e.g., in response to one or more control commands from the controller 122 or the actuator fluid pressure source 134 shown in FIG. 1), thereby positioning the absorber 320 and absorber surface 144 within the vacuum nozzle 212 and the beam path 114. As shown, the beam of laser energy 116 propagates through the scan lens 112, but is incident on the absorber surface 144, not on the workpiece 102. When the absorber 320 is positioned within the beam path 114, the heat transfer system 500 may be engaged as required (e.g., in response to commands from the controller 122 and/or the heat transfer fluid source 136 shown in FIG. 1) to control the transfer of heat away from the absorber 320 and the absorber surface 144. The insulator 156 may prevent residual heat from damaging the actuator assembly 400. Heat transfer fluid from the heat transfer fluid source 136 (shown in FIG. 1) enters the inlet 162, flows through the passage 164, through the passage 166 below the absorber surface 144, and is routed to the passage 168, exiting the outlet 170 (as shown in FIG. 6). In one embodiment, the heat transfer fluid may be routed to a heat exchanger or chiller (not shown) configured to extract heat from the heat transfer fluid. The cover 214 helps to support the absorber 320 in the extended position. As described above, the exhaust assist system 280 and the vacuum source 130 may be disengaged when the absorber 320 is extended, because no debris is being generated. Optionally, the exhaust assist system 280 and the vacuum source 130 both may remain engaged if desired (e.g., to evacuate any residual debris from the vacuum nozzle 212 through the exhaust passage 216 and the exhaust passage 242 and out the exhaust port 244).

III. CONCLUSION

The foregoing is illustrative of embodiments and examples of the invention, and is not to be construed as limiting thereof. Although a few specific embodiments and examples have been described with reference to the drawings, those skilled in the art will readily appreciate that many modifications to the disclosed embodiments and examples, as well as other embodiments, are possible without materially departing from the novel teachings and advantages of the invention. Accordingly, all such modifications to the subject matter described above are intended to be included within the scope of the invention as defined in the claims. For example, skilled persons will appreciate that the subject matter of any sentence, paragraph, example or embodiment can be combined with subject matter of some or all of the other sentences, paragraphs, examples or embodiments, except where such combinations are mutually exclusive. The scope of the present invention should, therefore, be determined by the following claims, with equivalents of the claims to be included therein.

What is claimed is:

1. A laser processing apparatus, comprising:

a laser source operative to generate a beam of laser energy, wherein the beam of laser energy is propagatable along a beam path toward a workpiece;

a scan lens; and a debris removal system positioned between the scan lens and the workpiece and operative to capture debris created by processing of the workpiece, wherein the debris removal system includes a beam dump system operative to absorb a portion of the beam of laser energy, wherein the scan lens is positioned along the beam path between the laser source and the debris removal system.

2. The laser processing apparatus of claim 1, wherein the beam dump system includes an absorber configured to be selectively positioned within the beam path being moved relative to the workpiece.

3. The laser processing apparatus of claim 2, wherein the beam dump system further includes an actuator assembly operative to selectively position the absorber within the beam path by moving the absorber relative to the workpiece.

4. The laser processing apparatus of claim 1, wherein the debris removal system further comprises:

a vacuum nozzle in communication with a vacuum source via an exhaust passage, the vacuum source configured to remove at least a portion of the debris created by processing of the workpiece, wherein the vacuum nozzle is positioned between the laser source and the workpiece;

an exhaust assist system operative to direct a fluid from a port across the vacuum nozzle into the exhaust passage, thereby forcing at least a portion of the debris into the exhaust passage; and an absorber having an absorber surface operative to absorb a portion of the beam of laser energy, the absorber configured to be selectively positioned within the beam path by being moved relative to the workpiece.

5. The laser processing apparatus of claim 2, wherein the beam dump system includes a heat transfer system operative to transfer heat away from the absorber.

6. A system, comprising:

a debris removal system having a vacuum nozzle configured to allow a beam of laser energy generated by a laser source and propagating along a beam path to pass therethrough, wherein:

the debris removal system is positioned between the laser source and a workpiece, and the debris removal system is configured to capture debris created by processing of the workpiece by the laser source;

a vacuum source in communication with the vacuum nozzle via an exhaust passage, the vacuum source configured to remove at least a portion of the debris created by processing of the workpiece by the laser source;

an exhaust assist system operative to direct a fluid from an inlet a port across the vacuum nozzle into the exhaust passage, thereby forcing at least a portion of the debris into the exhaust passage;

a beam dump system coupled to the debris removal system and including an absorber having an absorber surface formed thereon, the absorber surface configured to absorb at least a portion of the beam of laser energy; and an actuator assembly operative to move the absorber relative to the debris removal system and the workpiece.

7. A laser processing apparatus, comprising:

a laser source operative to generate a beam of laser energy, wherein the beam of laser energy is propagatable along a beam path to a workpiece;

a debris removal system having a vacuum nozzle configured to allow the beam of laser energy to pass therethrough, wherein the debris removal system is positioned between the laser source and the workpiece;

a vacuum source in communication with the vacuum nozzle via an exhaust passage, the vacuum source configured to remove at least a portion of debris created by processing of a workpiece;

a beam dump system coupled to the debris removal system and including an absorber having an absorber surface formed thereon, the absorber surface configured to absorb at least a portion of the beam of laser energy, wherein the absorber is configured to be selectively positioned within the beam path by being moved relative to the workpiece.

8. The laser processing apparatus of claim 7, wherein the beam dump system includes an actuator assembly operative to selectively position the absorber within the vacuum nozzle by moving the absorber relative to the workpiece.

* * * * *